Sept. 5, 1933.  E. W. DIETRICH  1,925,689

FORM CLAMP

Filed June 29, 1932

Witnesses

Inventor
Erich W. Dietrich,
Fisher, Clapp, Soans, & Pond,
Attys.

Patented Sept. 5, 1933

1,925,689

UNITED STATES PATENT OFFICE 1,925,689

FORM CLAMP

Erich W. Dietrich, Chicago, Ill.

Application June 29, 1932. Serial No. 619,852

3 Claims. (Cl. 85—32)

This invention relates primarily to screw threaded clamps, and is particularly adapted for use in connection with concrete wall forms although it may be applied to many different temporary fastenings.

Certain types of form clamps, particularly such as are used for concrete wall forms, include a rod having its ends threaded for engagement with nuts which secure the form against spreading. The old type of nut heretofore used for this purpose was applied and removed by rotating it in the well known manner. Frequently, the rods project a considerable distance beyond the form sides and, therefore, if nuts of the old type are used, much time is lost in the rotation of the nuts when they are applied and removed. Sometimes thousands of these clamps are used on a single wall and, in such cases, if some time is lost in applying and removing each nut, the total wasted time in assembling and dismantling each form is considerable.

The main objects of this invention are to provide an improved nut or other screw threaded member which is adapted to be shifted axially of the threaded rod without rotating either the rod or nut, thereby permitting a quick rough adjustment of the nut; to provide a nut of this kind which may be rotated as an ordinary nut when it is desired to obtain a fine adjustment; and to provide an improved form of thread for a nut of this kind which will secure the nut against accidental disengagement from the bolt when the nut is in effective contact with the work.

An illustrative embodiment of this invention is shown in the accompanying drawing, wherein.

Figure 1:
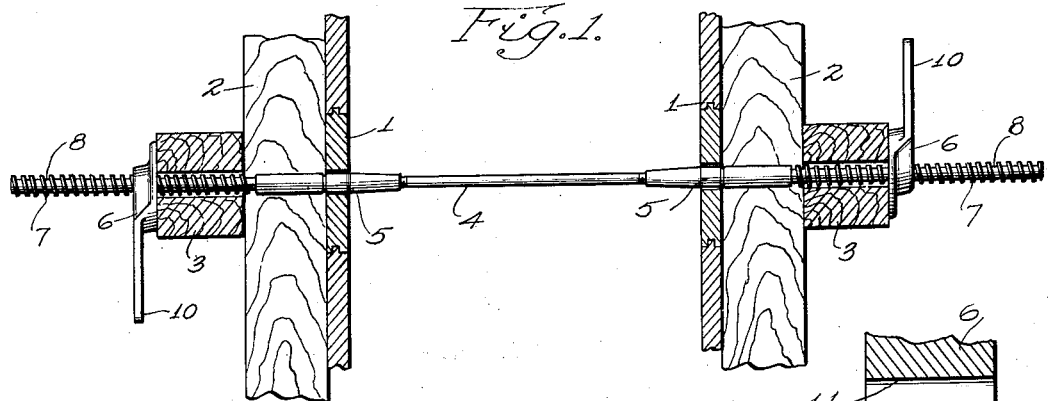
Figure 1 is a fragmentary vertical section of a wall form, to which an improved temporary fastening is applied.

In the particular construction herein shown, the invention is applied to a form clamp which is used in connection with a wall form comprising the usual sides 1, studs 2 and battens 3. The form clamp herein shown comprises an intermediate rod 4 located between the form sides and threaded to the inner ends of a pair of end bolts 5 which project outwardly through the form. Improved nuts 6 are mounted on the end bolts for engagement with the battens. The intermediate rod 4 is intended to be left embedded in the concrete wall, and the two end bolts are removed when the form is dismantled.

Figure 2:
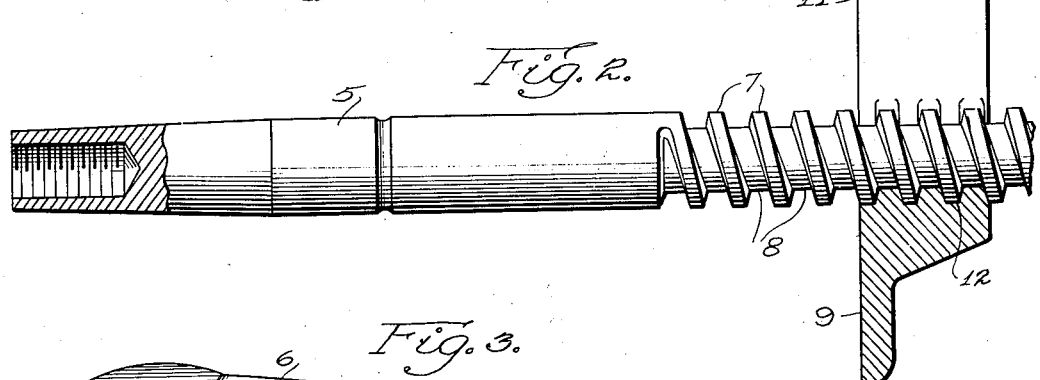
Fig. 2 is an enlarged fragmentary axial section of the temporary fastening, part of the rod being shown in elevation.
Figure 3:
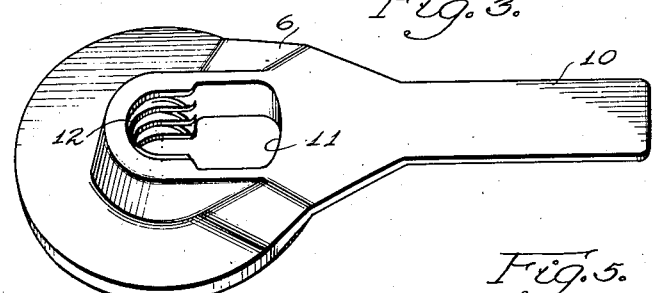
Fig. 3 is a perspective view of the nut.
Figures 4, 5, 6:
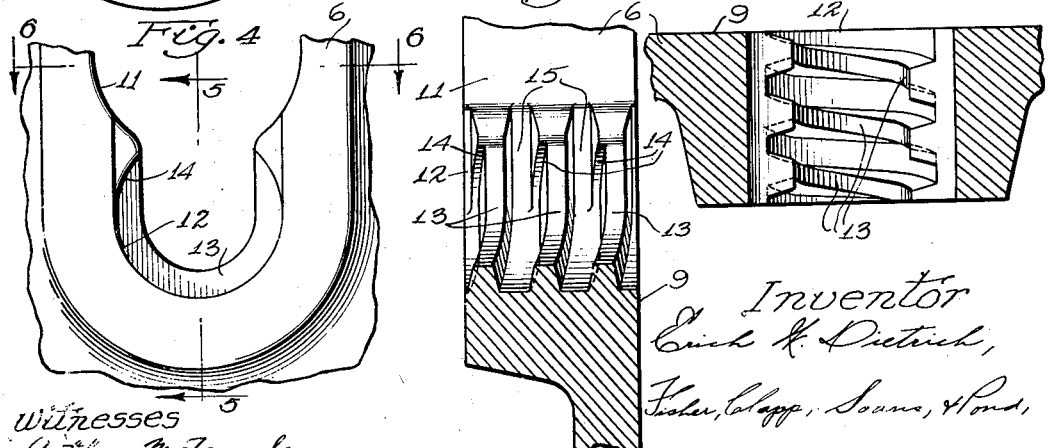
Fig. 4 is a fragmentary side view of the nut.
Fig. 5 is a section, taken on the line 5—5 of Fig. 4.
Fig. 6 is a section taken on the line 6—6 of Fig. 4.

The inner ends of the bolts 5 are tapered slightly so as to facilitate removal of the bolts after the concrete has set. Each end bolt has a helical rib 7 forming a thread in which the teeth are of less width than the intermediate spaces 8, as clearly shown in Figs. 1 and 2.

The nut 6 has a substantially flat bearing face 9 for engagement with the work. Formed on the nut, is a handle 10 which is preferably offset from the plane of the bearing face 9, so as to permit the handle to be readily grasped in one hand when being applied and removed. If desired, the handle may be omitted and the nut may be provided with the usual side faces for the application of a wrench.

Formed in the nut is a pair of inter-communicating openings 11 and 12 for receiving the bolt. The opening 11 is unobstructed so that when the bolt is in this opening, the nut may be shifted axially for a rough adjustment without any relative rotation of the parts.

Formed in the opening 12 are spaced ribs 13 forming an interrupted thread for engagement with the rod. These ribs 13 are of less width than the grooves 8 of the rod so as to permit a slight relative axial movement of the nut and rod when the nut is not under pressure for the purpose hereinafter described. If the nut and bolt were provided with standard acme threads, without any locking means, it would be possible for the nut to slip transversely of the rod so as to disengage the threads. It is for this reason that temporary fastenings of this general type heretofore in use were not satisfactory. In my improved construction I provide locking means within the nut which are adapted to positively secure the nut against transverse movement when it is in effective engagement with the bolt.

The locking means comprise shoulders 14 which are offset from the ribs 13 adjacent the ends thereof. These shoulders form stops which restrict the throat of the opening 12 so as to prevent the rod from entering the opening 11 as long as pressure is applied to the bearing face 9. When the pressure is released, as, for instance, when the nut is backed away from the work, the nut may be tilted, thereby permitting the bolt threads to pass through the spaces 15 between the shoulders 14 and the adjacent ribs 13.

In operation, when the nut is applied to the rod, it may be shifted axially without rotation as long as the rod is located within the opening 11. When the nut has been shifted into engagement with the batten 3 or other work, the nut is shifted transversely so as to bring the nut threads into engagement with the threads on the rod. The nut is then rotated as an ordinary nut until it firmly engages the work. The pressure of the work against the bearing face 9 causes the shoulders 14 to engage the threads of the rod, thereby preventing the nut from dropping out of threaded engagement with the rod. As long as the nut occupies the position shown at the left hand side of Fig. 1, there is no necessity for any locking means because the threads of the nut are at the top. However, in the position shown at the right side of Fig. 1, the threads of the nut are at the bottom and, therefore, if no locking means were provided, vibration might cause the nut to drop so as to bring the rod into the opening 11 of the nut, in which case the nut would not be effective.

To remove the nut it is necessary to first rotate it in a reverse direction so as to move it away from the work, whereupon the nut may be tilted to disengage the shoulders 14 from the threads of the rod.

It is to be understood that details of the construction shown may be altered or omitted without departing from the spirit of this invention as defined by the following claims:

I claim:

1. A clamp comprising a threaded rod, an unexpansible nut having two inter-communicating openings either of which is adapted to receive said rod from the other opening, one of said openings being unobstructed to permit axial adjustment of said nut without relative rotation of the parts, threads in the other of said openings for engagement with the rod threads, and a handle on said nut, said handle and threaded opening being located on diametrically opposite sides of said unobstructed opening, the handle side of said nut being heavier than the threaded side.

2. A device of the class described comprising a threaded rod, a nut having an opening for receiving said rod, interrupted threads at one side of said opening for engaging the threads on said rod, said opening being shaped to permit said nut to be shifted, transversely of said rod for disengaging said threads to permit axial adjustment of said nut without relative rotation of the parts, and shoulders adjacent the ends of said interrupted threads adapted to be shifted into engagement with the rod threads to secure said nut against movement transversely of said rod.

3. A device of the class described comprising a rod having a helical rib forming a thread, the teeth of said thread being of less width than the intermediate spaces, a nut having an opening for receiving said rod, and spaced ribs at one side of said opening arranged to form an interrupted thread for engaging said rod thread, said opening being shaped to permit said nut to be shifted transversely of said rod for disengaging said threads to permit axial adjustment of said nut without relative rotation of the parts, said nut ribs being provided with offset shoulders adjacent the ends thereof adapted to be shifted into engagement with said helical rib to secure said threads against disengagement when said nut occupies one position relative to said rod.

ERICH W. DIETRICH.